United States Patent [19]
Chang

[11] Patent Number: 5,304,436
[45] Date of Patent: Apr. 19, 1994

[54] METHOD AND APPARATUS FOR DRYING A NON-AQUEOUS LIQUID ELECTROLYTE

[75] Inventor: On-Kok Chang, San Jose, Calif.

[73] Assignee: Valence Technology Inc., San Jose, Calif.

[21] Appl. No.: 968,194

[22] Filed: Oct. 29, 1992

[51] Int. Cl.$^5$ .................. H01M 6/14; B01D 3/34; B01D 3/00
[52] U.S. Cl. ..................... 429/194; 34/80; 34/210; 159/16.1; 95/117; 95/902
[58] Field of Search ............. 429/194; 55/35; 159/16.1; 34/210, 80

[56] References Cited
U.S. PATENT DOCUMENTS
4,925,751  5/1990  Shackle ................... 429/191

OTHER PUBLICATIONS

*Catalog of Scientific Instruments and Laboratory Supplies 21st ed.* Mini-Catalog by Curtin Matheson Scientific, 1984.

Primary Examiner—C. Warren Ivy
Assistant Examiner—D. Margaret M. Mach
Attorney, Agent, or Firm—Russell LaPaglia

[57] ABSTRACT

A method and apparatus for drying a non-aqueous liquid electrolyte through the non-contact use of a desiccant includes a closed system having separate containers for the electrolyte and the desiccant. The closed system is charged with an inert gas, and a means is provided to circulate the gas between the containers. A stirring means is provided to stir the electrolyte to facilitate the release of water from the electrolyte.

7 Claims, 2 Drawing Sheets

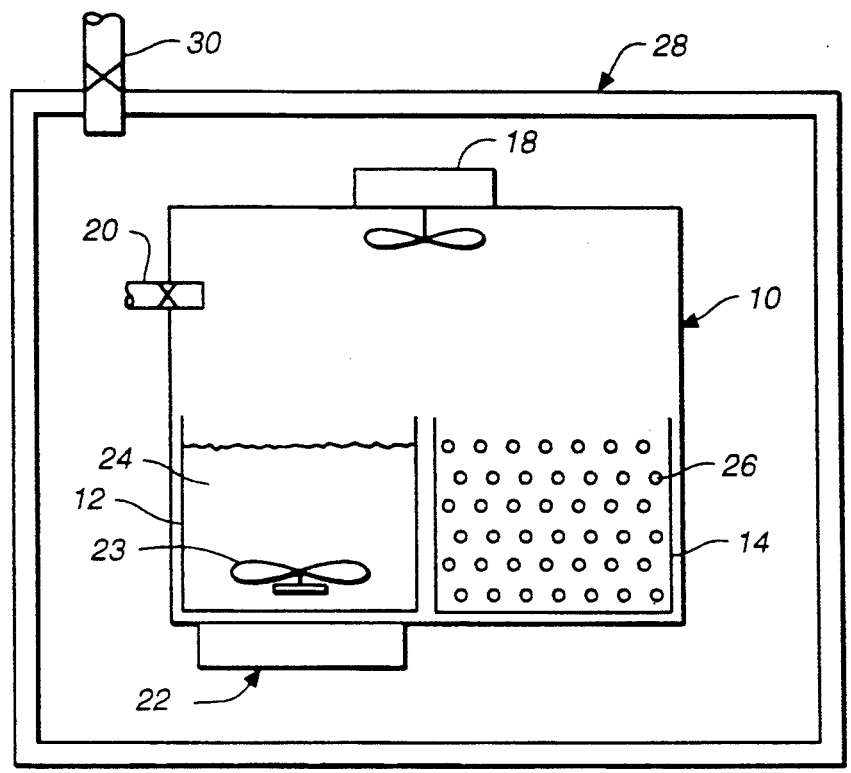
FIG._1
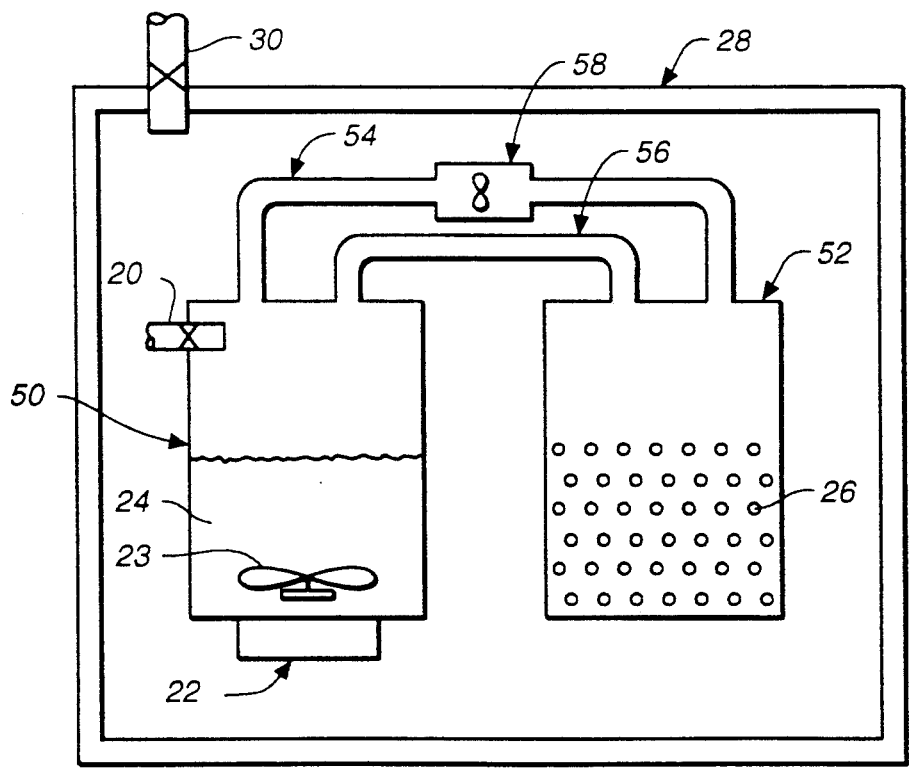
FIG._2

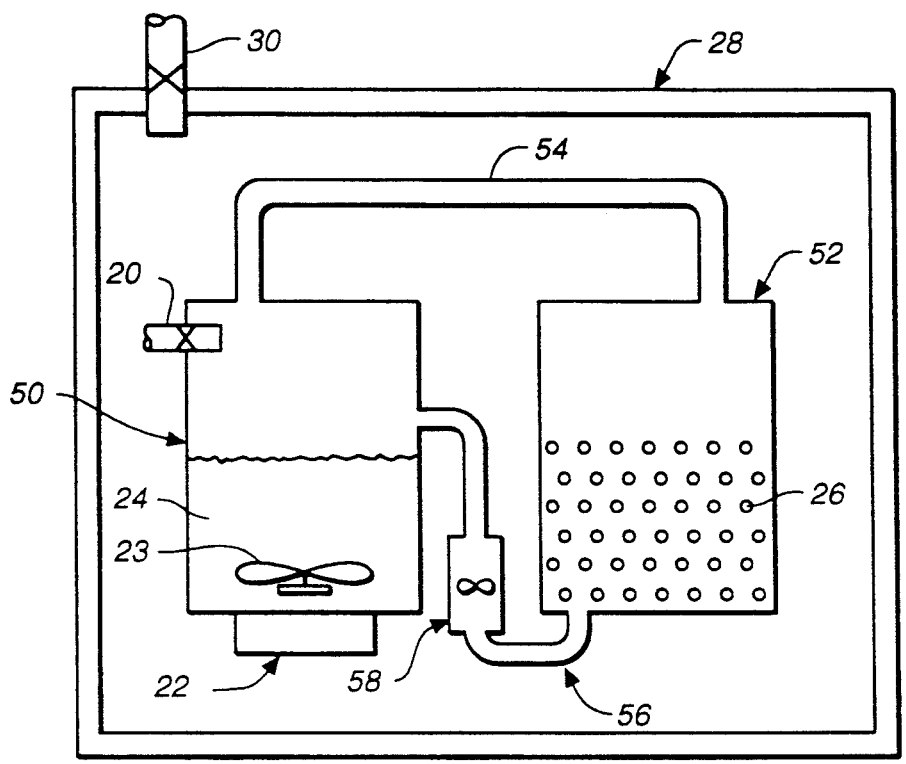
FIG._3
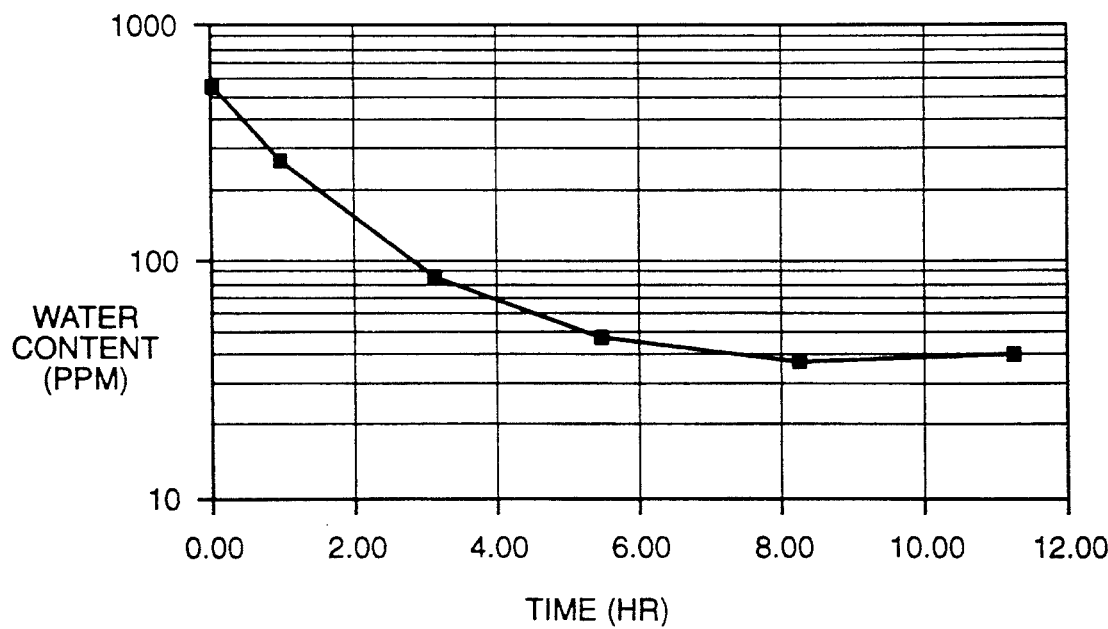
FIG._4

METHOD AND APPARATUS FOR DRYING A NON-AQUEOUS LIQUID ELECTROLYTE

BACKGROUND OF THE INVENTION

1. Field of the Invention

The present invention relates to the preparation of electrolytes for batteries, and more particularly, relates to the preparation of non-aqueous liquid polymer host network electrolytes for batteries.

2. State of the Art

In recent years workers in the battery art have begun to understand the advantages of manufacturing batteries that have polymer electrolytes and sheet-like cathodes and anodes. The advantages include lower battery weights than batteries that employ liquid electrolytes, longer service life, relatively high power densities, relatively high specific energies, and elimination of the danger of acid spillage.

Batteries of the type having polymer electrolytes and sheet like cathodes and anodes are generally formed of laminated sheets comprising thin layers of a cathode, an electrolyte, and an anode, which may be adapted into different configurations for various applications. The anode in such batteries is preferably lithium. Because lithium is highly reactive, its use as a sheet-like layer in contact with the electrolyte requires that the battery construction, and the electrolyte in particular, be free of contaminates, especially water.

The polymer is initially formed in a liquid state, and is later polymerized and formed into a solid sheet which is then incorporated into the battery. Removal of water from the electrolyte is best accomplished while the electrolyte is in liquid state, before the water becomes entrapped in the solid form and while the water is still substantially free to be removed. An electrolyte of this type is described in U.S. Pat. No. 4,925,751 to Shackle et al.

Most conventional methods for removing water from non-aqueous liquids involve passing the liquid through a column packed with a suitable desiccant agent. As the liquid flows through the column, it contacts the desiccant agent, which is selected to have a high affinity for water over the other components of the liquid. The water in the liquid which contacts the desiccant agent is thereby removed. One example of an apparatus for such a method is a column packed with a molecular sieve material.

This method of removing water from a non-aqueous liquid by contact with a desiccant agent has several disadvantages, however. The liquid may become contaminated by particulate matter or soluble material present in the desiccant agent. The desiccant may have some affinity for the liquid, or some component of the liquid, which may cause some of the material to be lost in the desiccant column. Furthermore, material other than water trapped in the desiccant makes drying and cleaning of the desiccant for reuse difficult. In addition, if the liquid contains hazardous materials, disposal of contaminated desiccant may require special handling and entail extra costs for disposal.

SUMMARY OF THE PRESENT INVENTION

The present invention, generally, provides a method and apparatus for removing water from a non-aqueous liquid that does not involve contact between the liquid and a desiccant agent.

More particularly, the present invention provides a method which includes placing a non-aqueous liquid to be dried in a first container, placing a desiccant agent in a second container, the first and second containers being in a closed system, charging the closed system with a dry, inert gas, circulating the gas between the containers, and stirring the liquid to facilitate evaporation of water from the liquid.

The method according to the present invention may further include placing the closed system in a dry box atmospheric chamber charged with an inert gas.

The stirring of the liquid and the use of a dry gas facilitate water escaping the liquid. The gas circulating between the chambers carries water to the desiccant agent, where the water is adsorbed. The method of the present invention is preferably carried out at room temperature to avoid components of the liquid being adsorbed by the desiccant.

The present invention also provides an apparatus for accomplishing the method. The first and second containing means are placed within a single closed chamber. The first containing means is provided with a means for stirring a liquid. The chamber is provided with a means for circulating a gas within.

Alternatively, each of the containing means may be a separate closed chamber. A gas conduit means for circulating gas between the chambers is provided in this alternative embodiment.

BRIEF DESCRIPTION OF THE DRAWINGS

The present invention can be further understood with reference to the following description in conjunction with the appended drawings, wherein like elements are provided with the same reference numerals. In the drawings:

FIG. 1 is a schematic view of an apparatus of the present invention.

FIG. 2 is a schematic view of an alternative embodiment of the present invention.

FIG. 3 is a schematic view of a variation of the embodiment of FIG. 2.

FIG. 4 is a graph of the results of an example trial of the method of the present invention.

DETAILED DESCRIPTION OF THE PREFERRED EMBODIMENTS

In FIG. 1, a drying apparatus includes a chamber 10 tht forms a closed system for a first containing means 12 and a second containing means 14. According to a preferred embodiment, the containing means 12, 14 are removable to facilitate their filling and emptying. However, the containing means 12, 14 may be formed as integral with the chamber 10. Containers 12 and 14 are open at the top to allow a gas to circulate between them.

A non-aqueous liquid electrolyte 24 is placed in the first container 12 and a desiccant agent 26 is placed in the second container. An example of an electrolyte which may be dried in the above-described apparatus is the electrolyte described in U.S. Pat. No. 4,925,751. The gas circulating between the containers 12, 14 carries water from the electrolyte 24 to the desiccant 26, where it is adsorbed. The drying operation is preferably done at room temperature to avoid the loss through evaporation of propylene carbonate, a volatile component of the liquid electrolyte.

A fan 18 is mounted at the top of the chamber 10 to provide circulation of the gas within the chamber. An inert gas source (not shown) is connected to the chamber 10 via a gas valve 20 for introducing the gas into the chamber. The atmosphere of the chamber 10 is charged with an inert gas to prevent the contamination of the electrolyte with oxygen or oxygen products during the drying operation. According to a preferred embodiment, argon is used, although any inert gas may be used. The inert gas is also preferably dry, having a water content ranging from 1 to 50 ppm and more preferably about 1 to 3 ppm.

A stirring means 23 is provided to stir the liquid electrolyte 24 in the first container. According to a preferred embodiment, the stirring means 23 is magnetically coupled to a motor 22 to avoid the need for an opening in the first container 12 for a drive shaft and to allow for the easy removal and interchanging of containers for successive operations of the system.

The desiccant agent 26 is provided in the second container. The desiccant agent must have a high selectivity for water and low selectivity for propylene carbonate, and other volatile components of the liquid electrolyte. The desiccant agent may be any hydroscopic substance such as activated alumina, calcium chloride, silica gel or zinc chloride. The desiccant agent is preferably a molecular sieve material such as zeolitic type materials including zeolite type 3A or type 4A. The affinity of zeolitic materials for a molecule is affected by the polarity of the molecule and its size. Because of the small pore size of zeolite type 3A, this material will absorb water but will not adsorb propylene carbonate, while type 4A, because of its larger pore size, does have a limited affinity for propylene carbonate. More preferably, therefore, the desiccant is a zeolite type 3A material.

The desiccant 26 is loosely packed in the second chamber 14 to permit the ready exposure of the water-carrying inert gas to the desiccant particles.

According to one embodiment, the chamber 10 is placed within an atmospheric chamber 28, or dry box, which is equipped for humidity control. The humidity in the atmospheric chamber 28 is set to a predetermined level, preferably ranging from 1 to 50 ppm and more preferably 1 to 3 ppm. The atmospheric chamber 26 is also charged with an inert gas which is supplied via a second gas valve 30 from a gas source (not shown). According to a preferred embodiment, argon is used, however, any inert gas may be used.

In FIG. 2, an alternative embodiment of the above-described apparatus includes a first container 50 is a sealable, liquid holding container. A stirring means 23 is provided for first container 50 to stir a liquid electrolyte 24 contained within the first container. Preferably, the stirring means is coupled to a magnetic motor drive 22 as shown, to avoid the need for an opening in the first container 50 for a drive shaft.

A second container 52 is provided which is also a sealable container. The desiccant agent 26 is placed within the second container 52, and loosely packed to facilitate gas contact with the surface area of the desiccant particles. A valve 20 connected to a source of an inert gas (not shown) provides the inert gas to the first chamber 50 and through the connecting pipe 54 to the second chamber 52.

Leading from the first container 50 to the second container 52 are first pipe means 54 and second pipe means 56. The pipe means 54, 56 carry gas between the first container 50 and the second container 52. The pipe means 54, 56 are herein denominated a wet pipe 54 and dry pipe 56. It should be understood, however, that this designation is arbitrary. The wet pipe 54 carries gas carrying water from the first container 50 to the second container 52. A fan 58 is interposed in the wet pipe 54 to draw gas from the first container 50 and circulate it to the second container 52, where the water is adsorbed by the desiccant 26. Dry gas returns from the second container 52 to the first container through dry pipe 56. The stirring means 22 facilitates the release of water from the surface of the liquid 24.

FIG. 3 shows a variation of the embodiment of FIG. 2. In FIG. 3, the dry pipe 56 is arranged at the bottom of the second container 52. The fan 58 is interposed in the dry pipe 56 to draw the gas through the desiccant column to facilitate adsorptive action by increasing contact of the gas with the desiccant 26.

Similar to the embodiment of FIG. 1, the first and second containers 50, 52 may be placed in an atmospheric chamber 28. The chamber 28 is charged with a dry inert gas by means of a valve means 30 connected to an inert gas source (not shown).

The method can be understood with reference to the following illustrative examples.

EXAMPLE 1

In this first example, drying of the electrolyte was done using a dry-box chamber without a desiccant agent. A quantity of the electrolyte was placed in an atmospheric chamber with a water content of 3 ppm. The apparatus was held at ambient temperature for. The water content of the electrolyte was reduced from approximately 600 ppm to 90 ppm by this method.

Next, the method was repeated with the temperature of the system held at 58° C. for. The water content of the electrolyte was reduced from approximately 600 ppm to 37 ppm by this method. The elevated temperature, however, caused a significant loss of propylene carbonate, a volatile component of the electrolyte, by evaporation. A change such as this in the electrolyte composition is undesirable and this method was rejected.

ILLUSTRATIVE EXAMPLE 2

An apparatus according to FIG. 1, described above was used in this example. Twenty grams of zeolite, type 4A, 8-12 mesh, was prepared by drying at 270° C., 300 mtorr for 2 hours and was then exposed to dry box atmosphere of 3 ppm water content for 15 hours. Type 4A was used because type 3A was not available at the time.

Twenty grams of the liquid electrolyte was prepared according to Innocell specification 2341, with the omission of a photo-initiator. The electrolyte was placed in the first container and the desiccant placed in the second container. The chamber was close and was placed in a dry box atmospheric chamber at 3 ppm water content and 27° C. Both the chamber and the dry box were charged with argon. The liquid was stirred at 40 rpm by a magnetic stirrer. A fan circulated the argon between the containers. Samples of the electrolyte were analyzed at intervals to determine the change in water content and propylene carbonate content.

The results of this drying operation are shown in FIG. 4. After about 8 hours exposure, the water content in the electrolyte was reduced from approximately 600 ppm to approximately 40 ppm. Further exposure in the system did not appreciably change the water content.

The propylene carbonate content in the electrolyte changed from 68.5% to 68.1% by weight during the process. Because zeolite type 3A will not adsorb propylene carbonate, as explained above, type 3A is expected to achieve a better result for this method.

The foregoing has described the principles, preferred embodiments and modes of operation of the present invention. However, the invention should not be construed as limited to the particular embodiments discussed, Instead, the above-described embodiments should be regarded as illustrative rather than restrictive, and it should be appreciated that variations may be made in those embodiments by workers skilled in the art without departing from the scope of the present invention as defined by the following claims.

What is claimed is:

1. An apparatus for removing water from a nonaqueous liquid electrolyte, comprising:
    a closed container system having,
        a first chamber for a liquid,
        a second chamber for a desiccant,
        a means for circulating an inert gas between said first chamber and said second chamber comprising a wet gas pipe to carry gas from said first chamber to said second chamber and a dry gas pipe to return gas from said second chamber to said first chamber,
        a means for stirring a liquid in said first chamber, and
        a means for introducing said inert gas into said closed container system;
    a dry box chamber wherein the atmospheric water content is in the range of 1 to 50 ppm containing said closed container system; and
    a means for introducing said inert gas into said dry box chamber.

2. The apparatus of claim 1, further comprising a fan interposed in at least one of the wet pipe and the dry pipe to circulate the gas between the chambers.

3. The apparatus of claim 2, wherein the wet pipe and the dry pipe are connected to the second chamber so that the gas is forced to pass through the desiccant.

4. A closed container system for removing water from a non-aqueous liquid electrolyte, according to claim 1 comprising:
    a first sealable container for containing the liquid electrolyte; and
    a second sealable container for containing a desiccant agent.

5. The apparatus of claim 1 wherein said inert gas is argon.

6. The apparatus of claim 1 wherein said desiccant is a zeolithic-type material.

7. The apparatus of claim 6 wherein said desiccant is zeolite 3A or 4A.

* * * * *